United States Patent Office 3,535,166
Patented Oct. 20, 1970

3,535,166
CHROMIC ACID-ORGANIC DIBASIC ACID
COATING COMPOSITIONS FOR METALS
Donald N. Hamilton, Painesville, Ohio, assignor to Diamond Shamrock Corporation, Cleveland, Ohio, a corporation of Delaware
No Drawing. Filed Apr. 16, 1968, Ser. No. 721,570
Int. Cl. C23f 7/26; C09d 5/08
U.S. Cl. 148—6.2
6 Claims

ABSTRACT OF THE DISCLOSURE

Corrosion-inhibiting, hexavalent-chromium-containing coating compositions for metal surfaces are prepared with chromic acid solutions containing a saturated aliphatic dicarboxylic acid compound in combination with pyrazole, or barbituric acid. The compositions are cured on metal surfaces at elevated temperature to augment the bonding of the resultant residue to such surface. Surfaces containing typically 5–600 milligrams per square foot of the residue exhibit enhanced corrosion resistance and, for weldable substrates, retain weldability without deleterious effect to corrosion resistance.

BACKGROUND OF THE INVENTION

In the copending U.S. application Ser. No. 484,747 to P. R. Cutter and D. N. Hamilton, now Pat. No. 3,382,081 issued May 7, 1968 it has been disclosed that desirable corrosion - inhibiting, hexavalent - chromium - containing coatings can be formed with chromic acid solutions wherein substantially all of the chromium is contained as hexavalent chromium. Furthermore, these solutions contain at least one saturated dicarboxylic acid, or such an acid in combination with another organic substituent, e.g., succinimide, acrylamide, or aspartic acid. Upon curing applied coatings, for example, as applied on a metal substrate, the resulting treated metal surface exhibits enhanced adhesion for subsequently applied paints, corrosion resistance, and retains weldability.

SUMMARY OF THE INVENTION

It has now been found that improved saturated-dicarboxylic-acid-containing, chromic acid solutions can be prepared. These solutions, in addition to having a saturated dicarboxylic acid compound, also contain pyrazole, barbituric acid, or their mixtures. After application and curing of such coating compositions to a metal substrate, the resulting substrate exhibits excellent enhancement in corrosion resistance. In addition to the enhancement of corrosion resistance, such compositions of the present invention also provide the further particular combination of desirable features of the comparative compositions, e.g., weldability without deleterious effect on corrosion resistance.

Broadly, the present invention is directed to a corrosion-inhibiting, hexavalent-chromium-containing coating composition for metal surfaces which comprises a volatile solvent having dissolved therein: (A) chromic acid in a concentration of between about 1 and 400 grams per liter; and (B) an organic component which is between about 60–90 weight percent of at least one non-aromatic carboxylic compound selected from the group consisting of saturated dicarboxylic acid of the structure

wherein $n$ is a whole number from 2 to 12 inclusive, anhydrides thereof where such exist, ammonium salts thereof where such exist and mixtures thereof, with the balance of said organic component being a polyfunctional organic compound selected from the group consisting of pyrazole, barbituric acid, and mixtures thereof. Furthermore, the total weight of substituents from the (B) component, i.e., organic component, is from about 1 to 100 grams per liter of the coating composition, with the molar ratio of $CrO_3$ to the total of such (B) component substituents being within the range from about 5:1 to about 0.7:1.

Additionally, this invention relates to a method for protecting metal substrate surfaces with an adherent, corrosion-resistant coating composition, and further relates to articles thus prepared.

DESCRIPTION OF THE PREFERRED EMBODIMENTS

The hexavalent-chromium-containing coating compositions of this invention are often referred to herein, for convenince, simply as "coating compositions," or as "chromic acid solutions" or, because of the adherency of resulting residues to a metal substrate after curing as a "bonding" coating composition. The metal substrate surfaces which can be protected by such coating compositions include any such substrates which are, or may be, protected by a hexavalent-chromium-containing coating composition. For example, such metal substrate surfaces include aluminum and alloys thereof, zinc and zinciferous substrates, copper and cupriferous substrates, e.g., brass and bronze, as well as cadmium, titanium, nickel and its alloys, tin, lead, chromium, magnesium and alloys thereof, and for weldability, preferably a ferrous substrate, e.g., stainless steel or steel such as cold rolled steel.

The chromic acid is present in the composition to the extent of about 1 to 400 grams per liter and generally about 30–45 grams per liter. It is to be understood that a minor amount of the chromic acid may be supplied by ammonium dichromate for the purposes of this invention. Moreover, lesser amounts of other water soluble salts of chromic acid, e.g., sodium dichromate, can be present in the composition for supplying a portion only of hexavalent chromium; but, after curing of the applied composition, a water rinse should be employed to enhance the corrosion resistance of the final coated surface.

For economy, water is the preferred solvent for this chromic acid solution although other solvents, e.g., organic solvents may be used. Tertiary butyl alcohol is the preferred organic solvent, readily dissolving the chromic acid, and, for example, higher molecular weight compounds, as well as being relatively stable in aqueous chromic acid solutions at ordinary temperatures encountered during application and/or storage of the coating composition. Advantageously, the solvent employed is a "volatile solvent," i.e., has a boiling point of about 100° C. or less at a pressure of 760 mm. Hg, to permit rapid drying of the applied coating composition.

The useful non-aromatic dicarboxylic acids for the dicarboxylic acid compound of this invention are also those saturated aliphatic dicarboxylic acids which have been shown to be useful in the copending application mentioned before. Such acids correspond to the structure $HOOC—(CH_2)_n—COOH$ wherein $n$ is 2 to 12 inclusive. Thus, when such acids are straight chain aliphatic acids the useful acids include succinic acid, glutaric acid, adipic acid, pimelic acid, and the like up through 1,14-tetradecanedioic acid. Additionally, branched chain saturated aliphatic carboxylic acids corresponding to the above structure which may be used in the practice of this invention include 2,3-dimethylsuccinic acid, 2,3-dimethylglytaric acid, 2-ethylsuberic acid, or their mixtures. Thus, the suitable dicarboxylic acids are straight chain or branched aliphatic acids or any mixtures thereof.

It is to be understood that for all of the foregoing carboxylic acids, such acids can be furnished in the coating composition in the form of their anhydride precursors where such exist. Moreover, the ammonium salts or such acids may also be employed in like manner where such exist. Thus, as used herein, the term "carboxylic acid compound," or "carboxylic compound," is meant to include the respective anhydride and/or ammonium salt of such acid.

The organic component is between about 60–90 weight percent of at least one of these dicarboxylic compounds. Less than about 60 weight percent of these compounds in the organic component can lead, after curing, to the presence on the metal substrate of a coating residue having undesirable adhesion to the substrate, i.e., such residue as is obtained after application of the coating to the substrate surface and heating of same. Moreover, these compounds are present in the organic component in an amount of less than about 90 weight percent, based on the total weight of the organic component, to augment coating durability and to provide coated substrates exhibiting suppressed amounts of unwanted chromium, which is more particularly defined hereinbelow.

The balance of the organic component, i.e., between about 10–40 weight percent of such component, is provided by pyrazole, or barbituric acid, or their mixtures.

The total organic component should be present in the coating composition in an amount between about 1 and about 100 grams per liter of such compostiion. The presence of less than about 1 gram per liter of such component in the chromic acid solution is uneconomical since it requires the evaporation of large amounts of solvent. Using more than about 100 grams of organic component per liter of bonding coat composition may cause solubility problems when water alone is the volatile solvent and additionally can lead to some sacrifice in the adhesion of subsequently applied paints. Preferably for good paint adhesion and economy, the coating composition contains between about 20–65 grams of organic component per liter.

Additionally the molar ratio of $CrO_3$ to the total organic component should be within the range of about 5:1 to about 0.7:1. A molar ratio of chromic acid to the total organic component of greater than about 5:1 may provide unwanted chromium in the resulting residue, that is, chromium present in the residue from the coating composition, which can be liberated if a water wash is applied to the film. A mole ratio of less than about 0.7:1 for the chromic acid to the organic component can provide cured films containing insufficient chromium for enhanced corrosion resistance. Preferably for enhanced corrosion resistance without the substantial formation of unwanted chromium in the cured film, the coating composition contains a molar proportion of $CrO_3$ to the organic compound within the range of about 3:1 to 1.5:1.

In addition to the substituents discussed hereinabove, the chromic acid solution may contain a non-ionic wetting agent such as alkylphenoxypolyoxyethylene ethanol, e.g., commercial nonylphenoxypolyoxyethlene ethanol, in concentrations typically up to about 3 grams per liter of the solution.

Before applying the coating composition to the substrate, it is desirable that the substrate be thoroughly cleaned. The use of a commercial alkaline cleaning composition which combines washing and mild abrasive treatments can be employed for this purpose, e.g., an aqueous trisodium phosphate-sodium hydroxide cleaning solution. In addition to cleaning, the substrate can undergo cleaning plus etching, e.g., with hydrofluoric acid etching agent. To accomplish the substrate etching and instead of applying only the chromic acid solution, a mixture can be applied which incorporates an etching agent in with the chromic acid solution. In lieu of a clean metal surface, an additional suitable surface for applying the coating composition is one wherein the metal substrate has been treated to exhibit a loose, powdery residue which is retained on the substrate for subsequent application of the coating composition. Such residues can promote adhesion for later applied paints.

Whether applied alone or in mixture with an etching agent, the coating composition may be applied to the substrate by any of the various methods for applying paint to a metallic substrate, for example, dip coating, roller coating, or reverse roller coating, curtain coating, airless spray, rotary brush coating, pressure spray, or combinations of such methods such as spray and brush techniques. The chromic acid solution can be suitably applied as a "mill finish," i.e., factory applied. For economy, these compositions are applied in an amount yielding, after curing, below about 600 milligrams of cured film, which is also referred to herein as a "coating residue," per square foot of substrate metal and, advantageously, for enhanced adhesion of subsequently applied and cured topcoatings, are applied in an amount to yield at least about 5 milligrams per square foot of such residue. Preferably, for best economy with excellent adhesion, the coating composition is applied in an amount between about 30–100 milligrams per square foot.

After application of the chromic acid composition, the substrate is heated, such as by infrared baking, at a substrate temperature, and for a period of time, sufficient to vaporize volatile solvent in the composition and deposit on the surface a composition residue which is most often at least substantially water insoluble, as well as adhering, i.e., "bonded," to the surface. After heating, the substrate surface is ostensibly dry to the touch, and the residue sufficiently bonded to the surface to withstand typically at least about two inch-pounds of impact without removal of coating to bare metal on the convex (reverse) surface. For such impact testing a metal ram of specified weight, in pounds, with a hemispherical contact surface is allowed to drop on the coated panel from a predetermined height, in inches.

Heating may be initiated essentially as soon as the composition is applied, for example, baking at a substrate temperature of 400° F. or greater within 10 seconds or less of application. Generally, however, especially for factory applied compositions, air drying, e.g., within the temperature range from about 65° to about 200° F. and for a time of a few minutes or less, will precede heating. The resulting material, after such air drying, is then usually baked, especially for the water based coating compositions, by raising the substrate to a temperature advantageously within the range from about 240° to about 550° F. Temperatures below about 240° F. can often provide for prolonged, inefficient curing while temperatures above about 550° can result in some final film degradation. The substrate is heated within the above temperature range for at least about 5 seconds, but, for economy, the heating is not continued for substantially more than about 10 minutes. Curing for less than about 5 seconds can be insufficient to prepare a tough, adherent undercoating.

The preferred baking temperature varies somewhat according to the particular coating composition used. For efficiency, infrared or radiant heat is preferred. In the circumstances in which tertiary butyl alcohol is used as a solvent, a substrate baking temperature of about 210°–340° F. is sufficient. When water alone is used, a higher temperature of preferably about 350°–400° F. can be employed. Water and tertiary butyl alcohol can be used together as a mixed solvent, so long as adequate solubility of the organic component is achieved, in which case the baking temperature is preferably within the range of about 350°–400° F.

After the coating composition is cured and the substrate cooled a weldable primer may be applied where a topcoating is desired but weldability is to be retained. Such weldable primers can contain a particulate, electrically conductive pigment of aluminum, copper, cadmium, carbon, zinc, or magnetite, i.e., the magnetic oxide of iron and their composition and use with coating compositions has been more fully disclosed in copending U.S. application Ser. No. 642,133 of B. E. Palm and E. W. Harwell. Additional topcoatings include any suitable paint, i.e., a paint, other primer, enamel, varnish, or lacquer. Such paints can contain pigment in a binder or can be unpigmented, e.g., generally cellulose lacquers, rosin varnishes, and oleresinous varnishes, as for example tung oil varnish. The paints may be solvent reduced or they can be water reduced, e.g., latex or water-soluble resins, including modified or soluble alkyds, or the paints may have reactive solvents such as in the polyesters or polyurethanes. Additional suitable paints which can be used include oil paints, including phenolic resin paints, solvent-reduced alkyds, epoxys, acrylics, vinyl, including polyvinyl butyral and oil-wax-type coatings such as linseed oil-paraffin wax paints. The paints can be applied as mill finishes.

When reference is made herein to welding of the substrate, it is to be understood that the subsequent welding under consideration can be spot welding, i.e., localized electrical resistance welding, or seam welding such as with roller electrodes. Typically spot welding can be performed with copper electrodes at electrode pressures from about 100 to about 5,000 pounds, and at 4–5 volts and about 10,000–17,000 amps operating conditions, with a weld time, in cycles, from about 4 to about 400 based on a 60 cycle frequency.

The following examples show ways in which the invention has been practiced but should not be construed as limiting the invention. In the examples the following procedures have been employed.

Preparation of test panels

Steel test panel (4″ x 12″, and all being cold rolled, low carbon steel panels) are prepared for coating application by typically immersing in water which has incorporated therein 4 ounces of cleaning solution per gallon of water. The cleaning solution is 25% by weight of tetrasodium pyrophosphate, 25% by weight of disodium phosphate, and the balance sodium hydroxide. The bath is maintained at a temperature of 160°–180° F. After dipping, the panels are rinsed with warm water while scrubbing with a soft bristle brush. These panels are designated "bare steel" panels in the examples.

Application of coating composition and curing

Unless otherwise indicated in the examples, the coating composition is applied by dipping the test panel into such composition, removing and draining excess composition from the panel, air drying at room temperature until the coating is dry to the touch and baking under infrared lamps or baking in a convection oven at a substrate temperature up to 450° F. for a time up to 6 minutes.

Corrosion resistance test (ASTM B–117–64)

Corrosion resistance of coated panels is measured by means of the standard salt spray (fog) test for paints and varnishes, ASTM B–117–64. In this test, panels are placed in a chamber kept at constant temperatures where they are exposed to a fine spray (fog) of a 5% salt solution for specified periods of time, rinsed in water and dried.

The extent of corrosion and film removal on the test panels can then be measured in inches of coating failure away from scribe lines as explained in more detail hereinafter in the examples.

Condensing humidity test

Water is heated and mechanically circulated in the bottom of a cabinet to produce a condition of 100% humidity in the cabinet and a temperature for the ambient steam within the cabinet of 120° F. Panels are placed in the cabinet at about a 15° angle to the water surface; the bottom edge of the panels is about 8 inches above the water surface and the top edge about 10 inches above the water surface. To terminate the test, panels are simply removed from the cabinet, air dried and visually inspected for coating failure, e.g., blisters and pin hole rust spots, on the face of the panel, that is, not around the panel edges.

Paint films

The paint films (topcoats) referred to in the examples are from a commercial white alkyd enamel topcoat which is applied to the panels by dip-coating. This alkyd paint is prepared from a modified alkyd resin based upon a system of partially polymerized phthalic acid and glycerine. The paint contains 50 weight percent solids and has a viscosity of 50 seconds as measured on a No. 4 Ford cup at 70° F. After coating panels with the enamel, the coating is cured by baking in a convection oven for 20 minutes at a temperature of 320°–325° F.

EXAMPLE 1

In Table 1 below, the results of the condensing humidity test is presented for coating compositions of the present invention together with a chromic acid-adipic acid-succinimide composition which is included for a basis of comparison with the compositions of the present invention. All of the coating compositions are solutions in water and each solution contains about 0.2 milliliter, per liter of composition, of a nonionic wetting agent bearing a nonyl phenyl hydrophobe and having an HLB No. of 16, a solidification temperature of 37° C., and an apparent specific gravity at 4°/20° C. of 1.077.

All coatings are applied and cured in the manner described hereinabove and the surface condition prior to application is bare steel. Where slight coating failure has been noted in the table, this typically refers to some pin points of red corrosion around a half-inch width at the edge of the panel face combined with a rust-free condition on the balance of the panel face, or some pin point corrosion on the face with an essentially rust-free panel edge. Medium coating failure refers to a condition of more aggravated apparent corrosion as well as more extensive distribution of corrosion failure over the surface of the panel.

TABLE I

| Ingredients | Concentration, grams/liter | Condensing humidity |
|---|---|---|
| $CrO_3$ | 40 | 91.5 hours, 5% red rust.[1] |
| Adipic acid | 20 | |
| Succinimide | 10 | |
| $CrO_3$ | 40 | 144 hours, 98% rust free. |
| Succinic acid | 15 | |
| Pyrazole | 5.1 | |
| $CrO_3$ | 40 | 192 hours, slight failure. |
| Succinic acid | 15 | |
| Barbituric acid | 9.7 | |

[1] Medium failure.

As is seen from the table, the compositions of the present invention afford excellent corrosion protection. Although the comparative chromic acid/adipic acid/succinimide composition achieves desirable corrosion resistance, it is substantially outperformed by the other compositions.

EXAMPLE 2

In Table II below, data from the salt spray test are set forth for bonding coating compositions of the present invention and a comparative chromic acid-succinic acid-succinimide bonding coat composition. The wetting agent of Example 1 is present in all compositions in an amount of about 0.2 milliliter per liter. Compositions are applied to bare steel surfaces and cured in the manner described hereinbefore. Paint films of the enamel topcoat are formed on each panel as described hereinabove. The figures presented in table, e.g., "0/32," indicates the inches of coating failure away from scribe lines which have been cut through to the steel, in an "X" configuration on the panel surface, prior to subjecting the panels to the test.

TABLE II

| Ingredients | Concentration grams/liter | Moles/liter | Salt spray, 168 hours |
| --- | --- | --- | --- |
| $CrO_3$ | 40 | | 1.5/32 |
| Succinic acid | 15 | | |
| Succinimide | 7.5 | 0.076 | |
| $CrO_3$ | 40 | | 0/32 |
| Succinic acid | 15 | | |
| Pyrazole | 5.1 | 0.075 | |
| $CrO_3$ | 40 | | 0/32 |
| Succinic acid | 15 | | |
| Barbituric acid | 9.7 | 0.076 | |

The results from the above table clearly demonstrate the superior corrosion resistance obtainable by the compositions of the present invention, particularly when compared with the chromic acid/succinic acid/succinimide composition which, itself, offers good protection.

Test panels, referred to hereinafter as "coupons," are coated with the chromic acid/succinic acid/pyrazole composition shown hereinabove and, following curing, resulting coupons are subjected to electrical resistance spot welding. This is performed with copper electrodes at an electrode pressure of 550 pounds using a weld time of nine cycles based on a sixty cycle frequency, and a weld heat of 12,500 amp-sec. During such welding, no metal expulsion is observed and no sticking of the coating to the electrodes is visibly apparent. Additionally, the welded coupons pull a good "button" in the peel test. In this test, two coupons which have been welded together by at least one spot weld are peeled apart past the weld, thereby tearing the welded spot from one of the coupons. Hence, one coupon has a hole at the place of the spot weld and the other coupon has a "button" of metal, at the place of the spot weld. The electrodes for the welding are circular and have a diameter of 0.250 inch. The button pulled from the test coupon, measured across its narrowest apparent diameter with a micrometer caliper calibrated for measuring to the nearest 0.001 inch, must be virtually 0.250 inch across to pull a good button. In view of the above, these panels are considered to be highly suitable for such electrical resistance spot welding.

It is to be understood that, although the invention has been described with specific reference to particular embodiments thereof, it is not to be so limited, since changes and alterations therein may be made which are within the full intended scope of this invention as defined by the appended claims.

I claim:

1. A corrosion-inhibiting, hexavalent-chromium-containing coating composition for metal surfaces which consists essentially of a volatile solvent having dissolved therein:
    (A) chromic acid in a concentration of between about 1 and 400 grams per liter; and
    (B) an organic component which is between about 60–90 weight percent of at least one non-aromatic carboxylic compound selected from the group consisting of saturated dicarboxylic acid of the structure HOOC—$(CH_2)_n$—COOH wherein $n$ is a whole number from 2 to 12 inclusive, anhydrides thereof where such exist, ammonium salts thereof where such exist and mixtures thereof, with the balance of said organic component being a polyfunctional organic compound selected from the group consisting of pyrazole, barbituric acid, and mixtures thereof; wherein the total weight of compounds from said (B) component is from about 1 to 100 grams per liter of the coating composition, with the mole ratio of $CrO_3$ to the total of said (B) component compounds being within the range of about 5:1 to about 0.7:1.

2. The coating composition of claim 1 wherein said dicarboxylic acid is selected from the group consisting of $C_4$–$C_{10}$ straight chain aliphatic acids, 2,3-dimethylsuccinic acid, 2,3-dimethylglutaric acid, 2-ethylsuberic acid, and their mixtures.

3. The method of protecting a metal substrate surface with a corrosion-resistant, hexavalent-chromium-containing composition wherein the protected surface exhibits enhanced corrosion resistance, which method comprises:
    applying to said surface a hexavalent-chromium-containing coating composition supplying an amount, after vaporization of volatile substituents from the applied composition, not substantially in excess of about 600 milligrams of composition residue per square foot of surface; and,
    heating said substrate at a temperature, and for a period of time, sufficient to vaporize volatile substituents from the applied composition and deposit on the surface said residue at least substantially bonded to said surface; wherein said coating composition comprises a solution of:
    (A) chromic acid in a concentration of between about 1 and 400 grams per liter; and
    (B) an organic component which is between about 60–90 weight percent of at least one non-aromatic carboxylic compound selected from the group consisting of saturated dicarboxylic acid of the structure HOOC—$(CH_2)_n$—COOH wherein $n$ is a whole number from 2 to 12 inclusive, anhydrides thereof where such exist, ammonium salts thereof where such exist and mixtures thereof, with the balance of said organic component being a polyfunctional organic compound selected from the group consisting of pyrazole, barbituric acid, and mixtures thereof; wherein the total weight of compounds from said (B) component is from about 1 to 100 grams per liter of the coating composition, with the mole ratio of $CrO_3$ to the total of said (B) component compounds being within the range of about 5:1 to about 0.7:1.

4. The method of claim 3 wherein said substrate is heated at a temperature maintained within the range from about 210° F. to about 550° F. and for a time of at least about 5 seconds.

5. The method of claim 4 wherein volatile components of said coating composition are at least in part evaporated from the applied composition prior to said heating and said residue is present on said surface after heating in an amount of at least about 5 milligrams per square foot.

6. A coated metal substrate comprising a coating on the surface of said substrate of between about 5–600 milligrams per square foot of the residue obtained upon heating an applied corrosion-resistant, hexavalent-chromium-containing coating composition at a temperature, and for a period of time, sufficient to vaporize volatile components from said coating composition, wherein said coating composition comprises:
    (A) chromic acid in a concentration of between about 1 and 400 grams per liter; and
    (B) an organic component which is between about 60–90 weight percent of at least one non-aromatic carboxylic compound selected from the group consisting of saturates dicarboxylic acid of the structure HOOC—$(CH_2)_n$—COOH wherein $n$ is a whole number from 2 to 12 inclusive, anhydrides thereof where such exist, ammonium salts thereof where such exist and mixtures thereof, with a balance of said oragnic component being a polyfunctional organic compound selected from the group consisting of pyrazole, barbituric acid, and mixtures thereof;

wherein the total weight of compounds from said (B) component is from about 1 to 100 grams per liter of the coating composition, with the mole ratio of $CrC_3$ to the total of said (B) component compounds being within the range of about 5:1 to about 0.7:1.

References Cited

UNITED STATES PATENTS

| | | | |
|---|---|---|---|
| 2,393,663 | 1/1946 | Thomas et al. | 148—6.2 |
| 2,480,448 | 8/1949 | Coates | 148—6.21 |
| 2,559,812 | 7/1951 | Watson | 148—6.2 |
| 2,793,932 | 5/1957 | Kahler et al. | 106—14 X |
| 2,887,418 | 5/1959 | Whitby | 148—6.2 |
| 2,927,046 | 3/1960 | Andrade | 106—14 X |
| 3,382,081 | 5/1968 | Cutter et al. | 148—6.2 X |

RALPH S. KENDALL, Primary Examiner

U.S. Cl. X.R.

106—14